Aug. 5, 1969  J. O. DANIELSSON  3,458,885
CONCRETE AGGREGATE EXPOSING APPARATUS
Filed Dec. 19, 1966
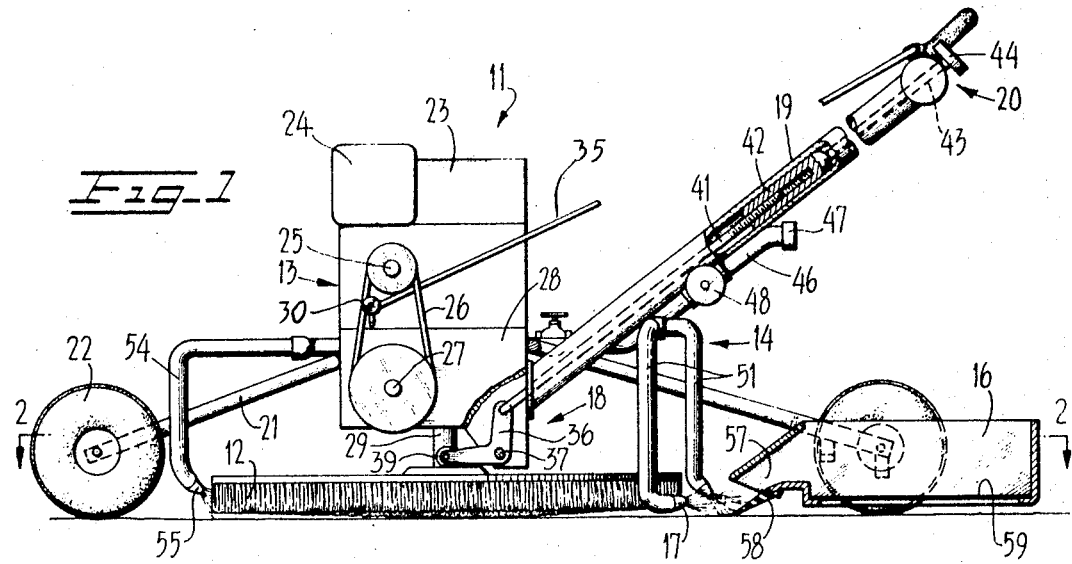
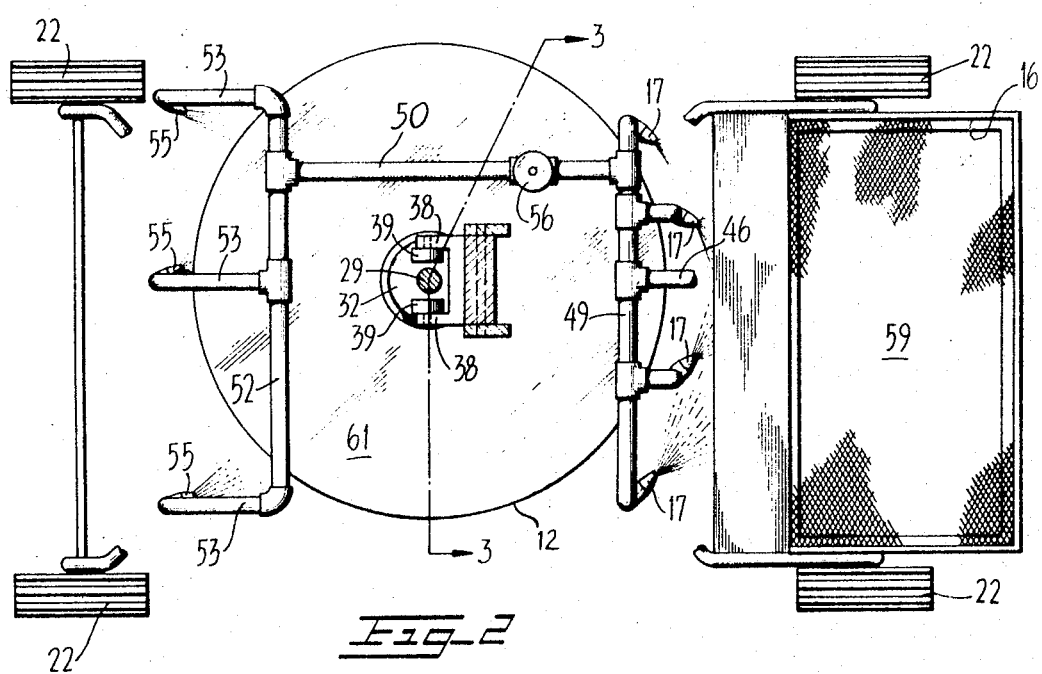
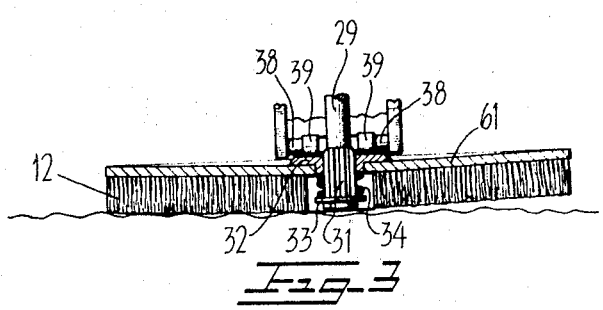
INVENTOR.
JAN O. DANIELSSON
BY
Gardner & Zimmerman
ATTORNEYS

# United States Patent Office 3,458,885
Patented Aug. 5, 1969

3,458,885
CONCRETE AGGREGATE EXPOSING APPARATUS
Jan O. Danielsson, P.O. Box 7,
Larkspur, Calif. 94939
Filed Dec. 19, 1966, Ser. No. 602,900
Int. Cl. A47l 11/00; E01h 1/04; B24b 23/00
U.S. Cl. 15—50                              3 Claims

ABSTRACT OF THE DISCLOSURE

This disclosure concerns apparatus for removing the top layer of cement and sand from a partly set concrete surface to provide an exposed aggregate concrete surface. The apparatus includes a vehicle upon which is mounted a rotary disc brush which is positioned so as to brush the surface and remove the top layer of cement. Suitable piping is included on the vehicle for wetting the surface before passage of the brush and for flushing the loosened cement therefrom. A collection box is also provided on the vehicle for collecting the loosened cement for suitable disposal.

---

The invention relates to apparatus for removing the top layer of cement, sand and aggregate from a partly set concrete surface to provide a finished concrete surface having exposed aggregate.

In many uses of natural and portland cement concrete surfaces, it is desirable to have the aggregate in the concrete exposed. For example, colored or variegated rock pebbles are often used as aggregate in the concrete mix for making patios, and the top layer of the cement is removed from the concrete before it is fully hardened to exposed the pebbles. This will provide an attractive patio surface as well as a roughened surface to minimize slippage. Concrete surfaces around swimming pools also are often exposed aggregate surfaces to provide a frictional surface which will reduce the chances of a swimmer slipping and falling due to the presence of water on the surface.

Exposed aggregate finishes on concrete surfaces generally in the past have been provided by hand. That is, after the concrete is partially set, workmen sweep the surface with brooms to loosen and remove the top layer of cement, sand and aggregate from the surface. With this procedure it will be appreciated that the workmen cannot control on each broom stroke the depth to which the brooms penetrate into the concrete. This results in the final aggregate surface being uneven and not uniformly exposed. Moreover because of the difficulty in controlling the brooms, the workmen are unable to provide a surface having aggregate exposed to a desired predetermined depth.

The particular time during the hardening or setting up of the concrete during which the aggregate must be exposed is fairly critical. On the other hand, however, the workmen must sweep fairly carefully and slowly if an acceptable surface is to be achieved. Thus, quite a force of sweepers is needed to sweep any area of an appreciable size in the short time available, resulting in a high labor cost which materially adds to the expense of exposed aggregate surfaces. This is aggravated by the fact that the quality of the finished surface is quite dependent upon the skill of the workmen. For this reason, skilled concrete aggregate sweepers are able to command a premium salary.

It is therefore an object of the present invention to provide an apparatus for removing to a uniform depth the top layer of cement, sand and aggregate from a concrete surface to provide the finished surface with exposed aggregate.

Another object of the invention is to provide such an apparatus having means for adjusting the depth to which the aggregate will be exposed.

A further object of the invention is to provide such an apparatus which includes means for directing liquid on the surface to facilitate removal of the top layer of cement and for flushing the loosened cement from the surface.

Still another object of the invention is to provide such an apparatus having a cement removing brush which is particularly adapted for removing the top layer of cement, sand and aggregate from a concrete surface.

One other object of the invention is to provide such an apparatus which includes a collection box for gathering and collecting the layer of cement removed from the concrete surface.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to such drawing:

FIGURE 1 is a side elevational view of a preferred embodiment of the invention with portions thereof broken away and in cross section.

FIGURE 2 is a cross sectional view of the apparatus taken generally on a plane indicated by the line 2—2 of FIGURE 1 but also including in full the portion of the apparatus which directs water onto the surface.

FIGURE 3 is a partial cross sectional view taken along the planes indicated by the line 3—3 of FIGURE 2 and showing the configuration of the cement removing brush of the apparatus.

In basic respects, the preferred embodiment of the invention depicted is a vehicle 11 adapted for passage over the concrete surface and having mounted thereon a cement removing brush 12. A prime mover, such as gasoline engine 13, is provided on the vehicle to actuate the brush for removal of the top layer of cement, sand and aggregate from the concrete surface. Piping, generally referred to by the reference numeral 14, is also mounted on the vehicle to direct water or other suitable liquid both forwardly of and rearwardly of the path of travel of the brush 12. This liquid acts to condition the surface for removal of the cement layer and to flush the loosened cement from the surface. A collection box 16 is also mounted on the vehicle for collecting the loosened cement. As shown, this collection box is mounted rearwardly of the brush, and nozzles 17 of the piping are oriented to cause the liquid flow to direct the loosened cement into the collection box. Adjustment mechanism referred to generally by the reference numeral 18 is provided for changing the height of the brush relative to the vehicle to thereby vary the depth to which the brush penetrates the concrete surface. The vehicle is preferably moved over the surface by a workman pushing it and to facilitate this a handle 19 extends angularly upward and rearward from the vehicle.

From the above it will be appreciated that the invention provides a simple, mechanized unit for providing an exposed aggregate surface on concrete. It is capable of being controlled by one man, thus reducing the labor costs involved in exposing the concrete aggregate. Moreover, except when it is being adjusted the brush will not move perpendicularly to the surface. Thus it will penetrate to a uniform depth over the entire surface. However, since the brush height relative to the surface is adjustable, a predetermined desired depth can be obtained.

As will be more fully explained below, the particular configuration of the brush assures that a line contact is made between it and the concrete surface, and that the brush approaches and leaves its line of contact with the concrete surface at a very gradual angle. Because of such, the brush removes the top layer of cement, etc. without disturbing the aggregate being exposed. This assures that the finished surface does not include loosened aggregate and that the surface finish is of a higher quality than can be obtained by sweeping.

Considering the apparatus in more detail, vehicle 11 comprises a tubular frame structure 21 for mounting the rest of the apparatus between four wheels 22. Wheels 22 are adapted for travel over partially set concrete, and for this purpose can be hard rubber wheels having a fairly wide tread. If desired, balloon type tires or skids could also be used. Handle 19 is also desirably tubular, and the upper free end thereof is provided with hand grip number 20.

In the embodiment depicted, prime mover 13 is a two-cycle gasoline engine having the usual engine block 23 and fuel tank 24. The output shaft 25 of the engine is connected by means of a pulley and belt assembly 26 to the input shaft 27 of a gear box 28. Gear box 28 includes suitable gears for transferring the rotary motion about a horizontal axis of the input shaft 27 to rotary motion about a vertical axis of the brush drive shaft 29, which extends from the bottom of the gear box.

Suitable controls for the operation of the engine are provided on handle 19. These controls include a clutch mechanism comprising a belt tightening roller 30 which is pivotally mounted on hte engine and is normally spring urged against the belt of assembly 26 to maintain such belt in tight driven relation with the pulleys. A pull rod 35 extends from the roller to within reach of the operator at the handle. When the operator pulls rod 35 rearwardly, the roller 30 is pivoted out of contact with the belt to thereby loosen the same so that it cannot transmit the rotary motion of the engine to the gear box. This results in the brush not being driven even though the operation of the engine is not interrupted.

As has been mentioned before, means are provided to enable adjustment of the depth to which brush 12 penetrates into the concrete surface. More particularly, as shown in FIGURE 3, the lower end of drive shaft 29 is splined and the splines 31 thereof fit within corresponding splineways on the interior circumference of a collar 32 which is rigidly secured axially to the brush 12. This spline connection assures that the brush will rotate with the drive shaft 29, and yet axial movement of the brush relative to the shaft is permitted. A nut and washer assembly 33 at the free end of the shaft maintains a coil spring 34 on the shaft in compression against the underneath surface of the brush 32. Spring 34 has a sufficient compression strength to normally urge the brush axially upward on the shaft 29.

Means are provided for holding brush 12 downward against the force of the spring at a desired position. More particularly, a forked L crank 36 is pivotally secured by a pin 37 to the vehicle with forked free ends 38 thereof extending on opposite sides of the driveshaft 29. Each of the fork ends 38 has suitably journalled therein a roller 39 adapted to engage and bear against the upper surface of the brush collar 32 during rotation of the brush. The particular positioning of these rollers relative to the end of the shaft 29 will determine the upward extent to which the spring 34 can urge the brush 12. Thus their positioning will determine the height of the brush relative to the vehicle and thereby the depth to which the brush will penetrate into the concrete surface.

To enable adjustment of the positioning of the rollers 39, a screw rod 41 is pivotally secured to the other end of the L crank and extends upwardly into tubular handle 19. The upper end of rod 41 is threadably engaged within a sleeve 42 within the handle. Sleeve 42 is suitably mounted within the handle so that it can be axially rotated therewithin but cannot be moved axially of such handle. It will therefore be appreciated that because of the threaded engagement between the sleeve and the rod rotation of such sleeve will move the rod 41 axially within the handle. This axial movement of the rod 41 will in turn pivot L crank 36 about pin 37 to position the rollers 39 at a desired position relative to the end of shaft 29. To enable the operator to effect the aforesaid rotation of sleeve 42, a rod 43 is rigidly secured to the upper end thereof and extends upwardly through the handle to the hand grips 20 whereat it terminates exterior to the handle with a turning knob 44. Rotation of the turning knob 44 by the operator will result, through the mechanism described, in an adjustment of the height of the rollers 39 and thereby the depth to which the brush 12 can penetrate below the surface of the concrete layer.

Liquid piping system 14 is adapted for securance to a water hose or the like and to direct water therefrom both forwardly of and rearwardly of the path of travel of brush 12. More particularly, piping system 14 includes a pipe 46 which extends upwardly along handle 19 and which is provided with a collar 47 at its free end for securing to the piping a water hose (not shown) such as a conventional garden hose. A control valve 48 is provided in pipe 46 to permit adjustment of the amount of water delivered to the concrete surface.

Pipe 46 terminates in a distribution pipe or manifold 49 extending transversely of the vehicle rearwardly of the brush 12. As best depicted in FIGURE 2, four nozzle pipes 51 extend downwardly from manifold pipe 49 behind brush 12 and terminate in the nozzles 17. These nozzles are oriented to direct the water onto the concrete surface and wash the cement thereon which has been loosened by the brush into the collection box 16. A pipe 50 extends forwardly from manifold 49 to a second distribution pipe 52 forwardly of the engine 13. Pipe 52 distributes liquid received from pipe 50 to three forwardly extending pipes 53, each of which terminates in a downwardly extending nozzle pipe 54 having a nozzle 55 at the end thereof for directing water in the path of the brush 12. A control valve 56 is positioned in pipe 50 to permit control of the proportionate amount of the liquid which is directed forwardly of the brush 12 for conditioning of the surface.

The collection box for the loosened cement and sand is mounted rearwardly of brush 12 between the rear wheels of the vehicles. As shown, such box includes an inlet mouth 57 at the forward edge thereof and into which the nozzles 17 direct liquid to force the loosened cement and the like into the box. The lower edge of the mouth is provided with a flexible lip 58 of rubber or the like to enable the edge to lightly engage the brushed concrete surface to direct the loosened cement into the collection box without disturbing the brushed surface. The bottom 59 of the box is perforated and is desirably open mesh so that the box will retain the particulate matter entrained within the liquid and yet allow the liquid to escape. While not shown in detail, it is to be appreciated that the box 16 is mounted to the vehicle frame by suitable conventional brackets which will permit removal of the box for emptying.

As briefly discussed previously, brush 12 is especially adapted for removing the top layer of cement and sand from the concrete surface. More particularly, as can be seen in FIGURE 3, the upper plate 61 of the brush from which the bristles depend is slightly conical with the apex of the cone extending downward. The conical configuration is right circular and the bristles depending from the lower surface of the plate are of a uniform length. This results in the brushing surface also being of a right circular conical configuration.

As is also apparent from FIGURE 3, the driveshaft 29 and brush 12 are tilted slightly so that the brush will present to the concrete surface to be brushed a brushing surface which is parallel to such concrete surface. Because of the conical configuration of the brush the whole surface of the brush will not be in contact with the surface. Rather, the brush will only be in contact with the surface along one line of the brush surface extending from the apex of the conical configuration, i.e., the end of driveshaft 29, to the periphery of the brush. This line is what is called a conical surface generating line since it passes through the apex and lies on the surface. It will be called a generating line herein and in the claim. Because the contact of the brush with the surface is a line contact the brush does not scrub or otherwise tear apart the surface but only removes the top layer of cement as desired. Moreover, the loosened cement is all brushed in one direction from the surface rather than circularly as would be the case if the rotary disc brush was flat. Because of the slightly conical configuration of the brush the portions of it approaching and leaving the line of contact as the brush rotates will be at a very gradual angle. Therefore, the brushing forces on the surface are generally parallel to the surface and the brush will not tend to "flick" the aggregate loose from the concrete.

The angular relationship of the brush relative to the surface is desirably such that the brush will tend to direct the loosened cement toward the inlet mouth 57 of the collection box. More particularly, the line of contact between the brush and concrete surface desirably follows the angular extending portion of the FIGURE 3 plane line in FIGURE 2. It will be appreciated that with the line of contact following this plane, the loosened cement will be directed rearwardly and inwardly toward the collection box.

It should be noted that the brush is not centrally disposed relative to the wheels of the vehicle, but is transversely offset from the center of the vehicle so that the periphery of the brush adjacent the point at which the brush contacts the surface extends outwardly to the outer edge of the wheels. This enables the brush to brush a surface immediately adjacent to a wall or other obstruction. The type of bristles utilized for the brush is not critical as long as such bristles are fairly stiff. For example, the bristles could be of any of the commonly used steels, fibres or plastics.

While it is preferred that a brush having a configuration corresponding to that just described be used, it is to be realized that other brushes could also be utilized but with a consequent reduction in the quality of the finished surface. For example, it would be well within the skill of the art to substitute a vibrating or oscillating brush, or a brush of the cylindrical roller type. Other modification will also be apparent to those skilled in the art.

What is claimed is:
1. Apparatus for removing the top layer of cement, aggregate and sand from a partly set concrete surface comprising a carrying vehicle adapted for travel over said concrete surface, a cement removing brush mounted for movement with respect to said vehicle, said brush having bristles disposed to contact and brush said top layer upon actuation of said brush, a prime mover mounted on said vehicle for actuating said brush, means on said vehicle for directing liquid on said surface in the path of said brush, a collection box mounted on said vehicle having a cement receiving opening rearwardly of said brush to collect the cement removed from said surface by said brush, and means mounted on said vehicle for directing liquid on said surface rearwardly of said brush to flush the loosened cement from said surface and direct it to the inlet opening of said collection box, the bottom of said box being perforated to allow escape of liquid therefrom.

2. Apparatus for removing the top layer of cement, aggregate and sand from a partly set concrete surface comprising a carrying vehicle adapted for travel over said concrete surface, a cement removing brush mounted for movement with respect to said vehicle, said brush having bristles disposed to contact and brush said top layer upon actuation of said brush, a prime mover mounted on said vehicle for actuating said brush, and means on said vehicle for directing liquid on said surface in the path of said brush, said brush being a rotary disc brush having a right circular conical brushing surface with the apex thereof extending downward, said brush being mounted on said vehicle to present a generating line parallel to the surface to be brushed whereby said brush contacts said surface on a line contact.

3. Apparatus according to claim 2 wherein a collection box is mounted on said vehicle rearwardly of said brush to collect the cement removed from said surface by said brush, said brush being oriented on said vehicle to direct said removed cement toward the inlet opening of said box.

References Cited
UNITED STATES PATENTS

| | | | |
|---|---|---|---|
| 2,317,843 | 4/1943 | Backlund | 15—50 |
| 2,626,412 | 1/1953 | Petersen | 15—50 |
| 2,958,881 | 11/1960 | Kazimierczak | 15—50 |
| 1,531,443 | 3/1925 | Johannessen | 15—51 |
| 2,003,215 | 5/1935 | Nadig | 15—320 |
| 2,731,659 | 1/1956 | Coplen | 15—320 |

EDWARD L. ROBERTS, Primary Examiner

U.S. Cl. X.R.

15—87, 180; 51—177; 94—44